(12) United States Patent
McGowan et al.

(10) Patent No.: US 9,631,769 B2
(45) Date of Patent: Apr. 25, 2017

(54) TELEVISION MOUNTING DEVICE

(71) Applicant: Ameriwood Industries, Inc., Wright City, MO (US)

(72) Inventors: Kevin McGowan, St. Charles, MO (US); Steve Wahrhaftig, West Chester, PA (US); Cory Neudeck, Richburg, NY (US)

(73) Assignee: Dorel Home Furnishings, Inc., Wright City, MO (US)

( * ) Notice: Subject to any disclaimer, the term of this patent is extended or adjusted under 35 U.S.C. 154(b) by 0 days.

(21) Appl. No.: 13/893,119

(22) Filed: May 13, 2013

(65) Prior Publication Data

US 2013/0299651 A1    Nov. 14, 2013

Related U.S. Application Data

(60) Provisional application No. 61/645,792, filed on May 11, 2012.

(51) Int. Cl.

| F16L 3/00 | (2006.01) |
|---|---|
| F16M 13/02 | (2006.01) |
| H02G 7/20 | (2006.01) |
| F16M 11/10 | (2006.01) |
| F16M 11/20 | (2006.01) |
| A45D 19/04 | (2006.01) |
| A47J 47/16 | (2006.01) |
| F16M 11/00 | (2006.01) |
| F16M 13/00 | (2006.01) |

(Continued)

(52) U.S. Cl.
CPC ............ *F16M 13/02* (2013.01); *F16M 11/10* (2013.01); *F16M 11/2014* (2013.01); *H02G 7/205* (2013.01); *A47B 21/06* (2013.01); *A47B 2021/064* (2013.01); *F16M 11/00* (2013.01); *F16M 11/08* (2013.01); *F16M 11/22* (2013.01); *F16M 11/24* (2013.01); *F16M 13/00* (2013.01); *F16M 2200/08* (2013.01); *H02G 3/04* (2013.01); *H02G 3/0425* (2013.01); *H02G 3/0481* (2013.01); *H02G 3/0487* (2013.01)

(58) Field of Classification Search
CPC .. H02G 3/0431; H02G 3/0425; H02G 3/0487; H02G 3/10; F16M 13/00; F16M 11/22; F16M 11/041; G10G 5/00
USPC .... 248/917, 919, 121, 127, 158, 176.1, 201, 248/910, 125.8, 150, 161; 52/287.1, 52/288.1; 174/480, 500, 504
See application file for complete search history.

(56) References Cited

U.S. PATENT DOCUMENTS 3,714,750 A * 2/1973 Pallotto ..................... 52/220.1
3,888,354 A * 6/1975 Margolin et al. ............. 211/110
(Continued)

FOREIGN PATENT DOCUMENTS

JP    2007322592 A    12/2007

OTHER PUBLICATIONS

International Search Report, International Patent Application No. PCT/US13/40796, mailed on Sep. 12, 2013, 11 pages.

*Primary Examiner* — Brian Mattei
*Assistant Examiner* — Taylor Morris
(74) *Attorney, Agent, or Firm* — Lewis Rice LLC (57) ABSTRACT

Television mounting devices that can be stand-alone wall mounted, wall mounted with furniture positioned in front, or attached/mounted to furniture, and that also accommodate differing types of television or other electronics and wires in an efficient and visually appealing manner.

20 Claims, 9 Drawing Sheets

(51) Int. Cl.

| | |
|---|---|
| H02B 1/40 | (2006.01) |
| H02B 1/015 | (2006.01) |
| H02G 3/08 | (2006.01) |
| F16M 11/22 | (2006.01) |
| H02G 3/04 | (2006.01) |
| F16M 11/24 | (2006.01) |
| A47B 21/06 | (2006.01) |
| F16M 11/08 | (2006.01) |

(56) References Cited

U.S. PATENT DOCUMENTS

| | | | |
|---|---|---|---|
| 4,561,617 A * | 12/1985 | Hafner | 248/121 |
| 5,282,427 A * | 2/1994 | Steinhilber | A47B 21/03 |
| | | | 108/152 |
| 5,918,841 A * | 7/1999 | Sweere et al. | 248/123.11 |
| 6,138,970 A * | 10/2000 | Sohrt et al. | 248/278.1 |
| 6,364,128 B1 * | 4/2002 | Wohlford | 211/26 |
| 6,419,511 B2 * | 7/2002 | Lizell | 439/210 |
| 6,863,252 B2 * | 3/2005 | Bosson | 248/278.1 |
| 7,118,080 B2 * | 10/2006 | Chan et al. | 248/129 |
| 7,182,301 B1 * | 2/2007 | Oddsen et al. | 248/122.1 |
| 7,461,417 B2 * | 12/2008 | Godbersen | A47K 3/003 |
| | | | 248/125.7 |
| 7,490,370 B2 * | 2/2009 | Macey et al. | 4/559 |
| 7,530,538 B2 * | 5/2009 | Whalen et al. | 248/125.8 |
| 7,588,222 B1 * | 9/2009 | Feldberg | 248/218.4 |
| 8,070,117 B2 | 12/2011 | Burge | |
| 8,079,311 B2 | 12/2011 | Whalen et al. | |
| 2004/0188574 A1 | 9/2004 | Weatherly et al. | |
| 2005/0188902 A1 * | 9/2005 | Savoie | 108/107 |
| 2006/0207480 A1 | 9/2006 | Knight | |
| 2008/0068784 A1 | 3/2008 | Bouissiere | |
| 2008/0156949 A1 | 7/2008 | Sculler et al. | |
| 2008/0308687 A1 * | 12/2008 | Terry | 248/122.1 |
| 2009/0188713 A1 * | 7/2009 | Overes | 174/504 |
| 2010/0124039 A1 * | 5/2010 | Li | A45B 3/00 |
| | | | 361/810 |

* cited by examiner

TELEVISION MOUNTING DEVICE

CROSS REFERENCE TO RELATED APPLICATION(S)

This application claims the benefit of U.S. Provisional Patent Application Ser. No. 61/645,792 filed May 11, 2012, the entire disclosure of which is incorporated herein by reference.

BACKGROUND

1. Field of the Invention

This disclosure relates generally to video display devices, and more particularly, to television mounting systems for flat panel televisions.

2. Description of Related Art

Historically, electronic equipment was, and still largely is, located and stored on some type of shelving system, console, or stand for convenient operation and use. For example, a home entertainment center (or stereo console) is a piece of furniture seen in many homes, which houses major electronic items, such as a television set, a VCR and/or DVD player, stereo components (such as an AM/FM tuner, multi-disc compact disc changer, record player, one or more cassette players, and graphic equalizer), and cable or satellite television receivers. These electronics typically require some type of cords, cables and/or wires (which are generally referred to herein as wires) either interconnected with the electronics or connected to an electrical outlet. Typically though, the electronics are spatially separated such that these wires are easily viewable and visually unappealing. In the alternative, large entertainment centers and stands were used to house all the electronics and hide the wires. However, such entertainment centers and stands were often very bulky and greatly contrasted with the appearance of the wall.

The invention of the flat panel televisions and computer monitors has substantially reduced the need for these large pieces of furniture. Furthermore, these flat panel televisions are very thin in comparison to the older, conventional CRT televisions, making them suitable for wall-mounting. As a result, smaller pieces of furniture can be utilized to house the remaining electronics.

Wall-mounting of televisions, however, has problems of its own. While flat panel televisions are much smaller than conventional CRT televisions, they are still very heavy. Thus, the flat panel televisions are typically mounted with large screws and mounted into studs on the wall. Furthermore, because the flat panel televisions is mounted to the wall, it is separated from the outlet and the other interconnected electronics (e.g., cable box, DVR player, surround system, etc.) and lacking an efficient wire management system. Thus, visually unappealing exposed wires run along the wall from the flat panel televisions to the outlet and the associated electronics.

Moreover, a wall is a permanent structure and provides no access points to hide the wires and run the wires within the wall. Therefore, to alternatively run wires within the wall (and thus hide the wires), the dry wall had to be removed, a wire management system installed (e.g., a conduit for running wires from the television down to the remaining interconnected electronics with openings at different points where electronic devices are located), and a new dry wall permanently installed over the wire management system. And since the dry wall is permanent, it can be very difficult to add or remove wires, requiring fishing the wire in or out of the different openings within the conduit. Thus, although the wires may run behind the wall to hide the visually unappealing exposed wires, this is a very costly, time-consuming, and difficult process, requiring significant structural and aesthetic changes to the wall in order to hide the wires and to access them again after they have been concealed.

Accordingly, there is a need for an adjustable television stand that can support televisions of different sizes and shapes in a variety of different manners (e.g., attached to a wall or storage console) that also has an efficient design and system for managing wires.

SUMMARY

In view of the above described and other problems in the art described herein, applicants disclose herein television mounting devices that can be stand-alone wall mounted, wall mounted with furniture positioned in front, or attached/mounted to furniture, and that also house differing types of television or other electronics and wires in an efficient and visually appealing manner.

There is described herein, among other things, a television mounting system comprising: an elongated pole, the pole including a bottom weight-bearing end placed on the floor of a structure and a television mount attached toward the top end thereof; a mounting bracket, the mounting bracket securing the pole in spaced relationship to a wall; a cover, the cover attaching to the pole in such a manner so as to cover the pole and create an enclosed space between the cover and the wall, the enclosed space being of sufficient size to accept a plurality of cables from a television mounted on the television mount.

In an embodiment of the system, the mounting bracket is one of a plurality of mounting brackets used to secure the pole to the wall.

In an embodiment, the system further comprises a shelf attached to the elongated pole.

In an embodiment of the system, the shelf is attached to the mounting bracket.

In an embodiment of the system, the shelf can be mounted at a plurality of locations along the pole.

In an embodiment, the system further comprises an upper cover, the upper cover being positioned between the shelf and the television mount and creating an enclosed space between the upper cover and the wall, the enclosed space being of sufficient size to accept a plurality of cables from a television mounted on the television mount.

In an embodiment of the system, the cover attaches to the elongated pole without the need for tools.

In an embodiment of the system, the cover snaps into place on the elongated pole.

In an embodiment of the system, the elongated pole comprises at least two portions.

In an embodiment of the system, at least one of the at least two portions rotates about an axis parallel to the elongated pole relative to a second of the at least two portions.

There is also described herein a television mounting system comprising: an elongated pole, the pole including a bottom weight-bearing end placed on the floor of a structure and a television mount attached toward the top end thereof; a mounting bracket, the mounting bracket securing the pole in spaced relationship to a backside of a piece of furniture; a cover, the cover attaching to the pole in such a manner so as to cover the pole and create an enclosed space between the cover and the backside of the piece of furniture, the enclosed space being of sufficient size to accept a plurality of cables from a television mounted on the television mount.

In an embodiment of the system, the mounting bracket is one of a plurality of mounting brackets.

In an embodiment of the system, the plurality of mounting brackets includes at least one bracket for securing the pole to an underside of the piece of furniture.

In an embodiment, the system further comprises a shelf attached to the elongated pole.

In an embodiment of the system, the shelf is attached to the mounting bracket.

In an embodiment of the system, the shelf can be mounted at a plurality of locations along the pole.

In an embodiment, the system further comprises an upper cover, the upper cover being positioned between the shelf and the television mount and creating an enclosed space between the upper cover and a wall positioned adjacent the backside of the piece of furniture, the enclosed space being of sufficient size to accept a plurality of cables from a television mounted on the television mount.

In an embodiment of the system, the cover attaches to the elongated pole without the need for tools.

In an embodiment of the system, the cover snaps into place on the elongated pole.

In an embodiment of the system, the elongated pole comprises at least two portions, at least one of the at least two portions rotating about an axis parallel to the elongated pole relative to a second of the at least two portions.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

DESCRIPTION OF THE PREFERRED EMBODIMENTS

The television mounting device of the present disclosure has numerous advantages over currently known units and systems for storing electronics. First, the known units and systems for storing electronics are generally of one of two types: (1) a device mounted and secured directly to the wall; or (2) a piece of furniture with a built-in television mount or stand. The device of the present disclosure provides a television mount that can be utilized with a variety of different sizes, shapes, and types of furniture.

Second, the known mounting devices generally require that the television be mounted and secured directly to the wall. Thus, the mounting requires installation into studs in the wall in order to support the weight of the television, creating unsightly holes in the wall. The device of the present disclosure, by having an integrated television mount and a weight-bearing base, gives the appearance of a television secured to the wall but which can be either secured to an electronic console-type furniture or attached to a wall without requiring mounting to studs, and at most, requires minimal mounting onto the wall in order to prevent the unit from tipping forward (i.e., as opposed to mounting to support the full weight of the electronic device(s)).

Third, because the television is typically mounted a significant distance above the other interconnected electronics (e.g., on an electronic console-type furniture) and the associated outlets, the wires between the electronics are either exposed or hidden behind the wall. Exposed wires are visually unappealing; moreover, it is very costly and requires significant structural changes to the wall in order to hide the wires behind the wall. The devices of the present disclosure, with their removable covers, efficiently hide and manage the wires, while maintaining the appearance of a television mounted to the wall. In other words, the device allows cables, cords, and wires to be hidden from the exposed, exterior surface of the device. In this regard, the covers of the device create a channel between the cover and the wall, which hides the wires from view while still allowing for easy access to the wires. Furthermore, the covers can be added and removed with ease and without the need for tools.

Figure 1A:
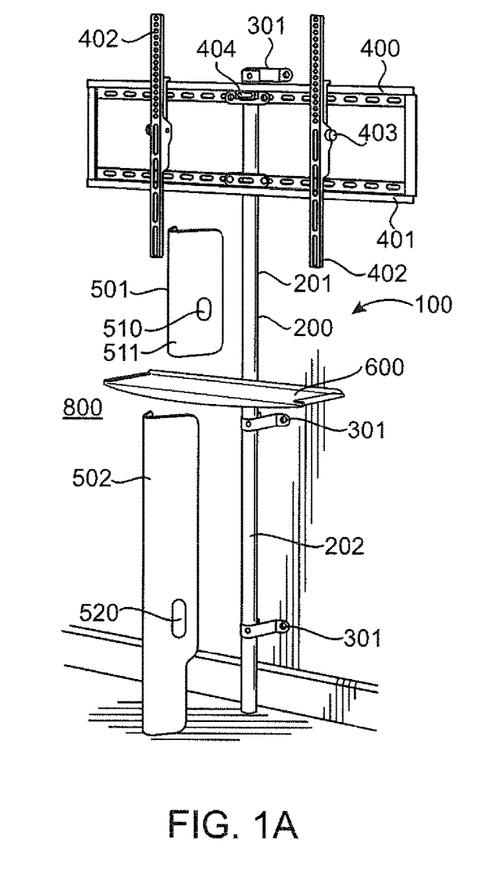
FIG. 1A provides a perspective view of an embodiment of the television mounting device with the covers removed.
Figure 1B:
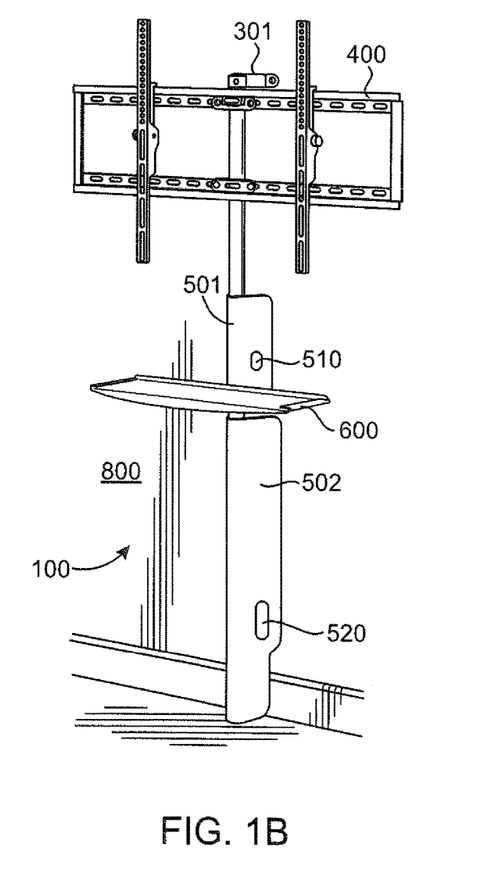
FIG. 1B provides a perspective view of an embodiment of the television mounting device with the covers attached.
Figure 2:
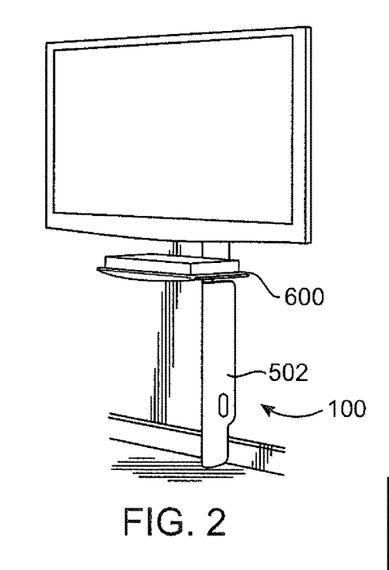
FIG. 2 provides a perspective view of an embodiment of the television mounting device as a stand-alone wall mounted unit.
Figure 3:
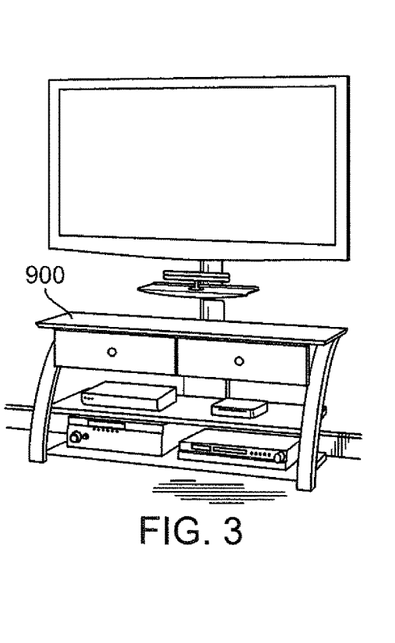
FIG. 3 provides a perspective view of an embodiment of the television mounting device as a wall mounted unit with furniture positioned in front.
Figure 4:
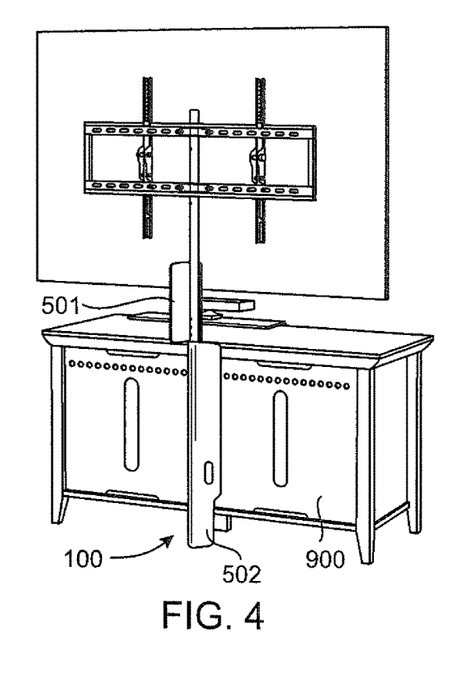
FIG. 4 provides a perspective view of an embodiment of the television mounting device attached directly to furniture.

As discussed, the present disclosure is directed to various types of mounting devices for televisions that can be stand-alone wall mounted (e.g., FIG. 2), wall mounted with furniture positioned in front (e.g., FIG. 3), or attached/mounted to furniture (e.g., FIG. 4) (and all without the requirement of securing or mounting the device to wall studs); that are readily customizable and adjustable for use with a variety of different sizes, shapes, and types of televisions and furniture; and that house television and other differing types of electronics and wires in an efficient and visually appealing manner. With reference now to FIGS.

1-10, the television mounting device will be described according to several embodiments of the present invention.

The device (100) is generally comprised of a pole (200) with mount brackets ((301) and (302)), with one of the mount brackets (301) designed for attaching the pole (200) to either a wall (800) or the backside of a piece of furniture (900) and the other mount bracket (302) designed to be mounted to the underside of the piece of furniture (900), if applicable. Although brackets are utilized in the depicted embodiments for attaching the pole (200) to either the wall (800) or the furniture (900), one of ordinary skill in the art would readily recognize that brackets are in no way the only means for securing the pole (200). For example, the pole (200) could be directly secured to the backside of the furniture (900).

The pole (200) also has a television mount (400) attached thereto near the top. Additionally, covers ((501) and (502)) can be attached to the pole (200) to hide the pole (200) from view and to create a channel for management of the wires of the associated electronic devices. Finally, the device (100) may include a shelf (600) attached to the pole (200) by a cantilevered bracket (303), or the shelf (600) can be mounted directly to the wall (800) and apart from the pole (200) by a wall bracket (304). In any event, the device (100) is designed to sufficiently withstand the weight of the electronic devices such that the device (100) does not need to be mounted to studs in the wall (800). In other words, device (100) itself is weight-bearing, removing the need to have the wall bear the weight of the television. When the device (100) is mounted to the wall, the wall mounting is merely to prevent the device (100) from tipping (and not to support the full weight of the television or other electronic devices).

Figure 5A:
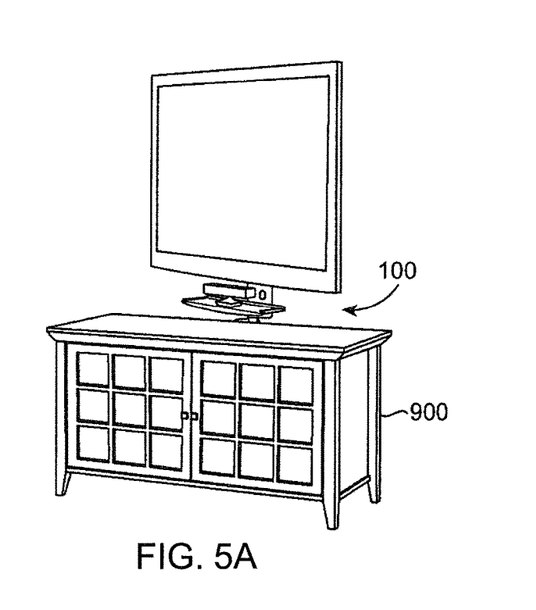
FIG. 5A provides a perspective view of the embodiment in FIG. 4, showing the swivel system of the device.
Figure 5B:
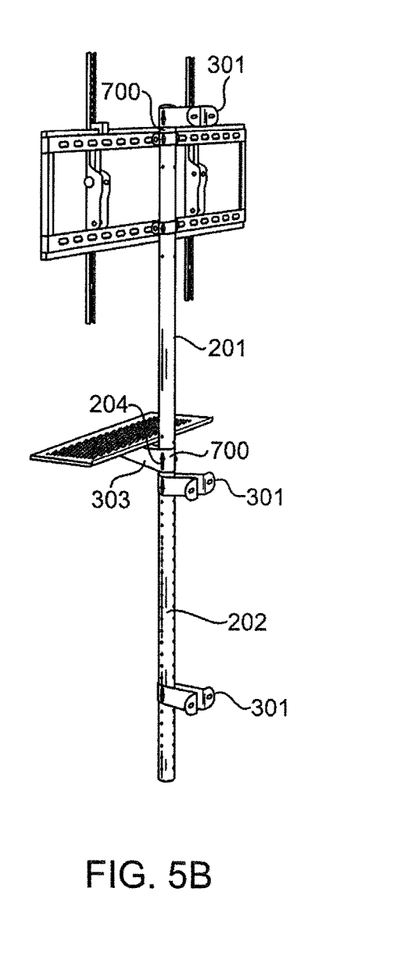
FIG. 5B provides a perspective view of an embodiment of the television mounting device, showing the swivel system of the device.
Figure 6A:
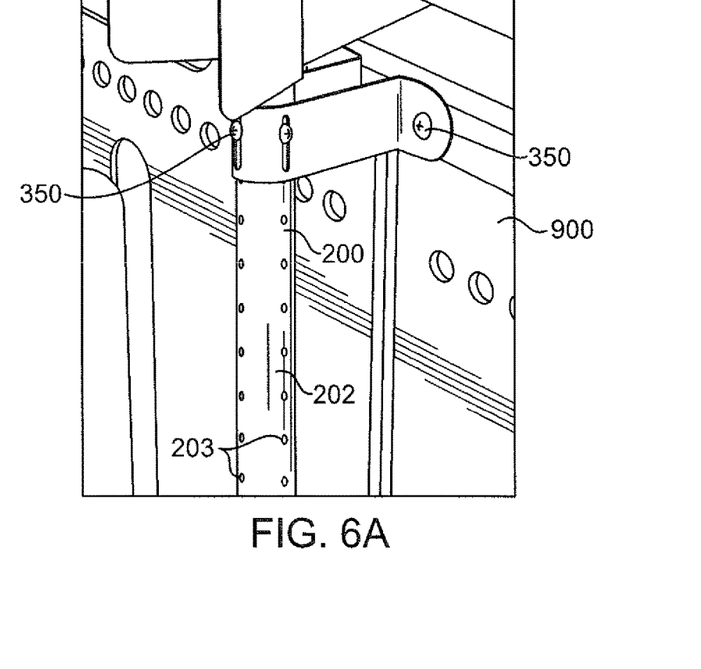
FIG. 6A provides a perspective view of the embodiment in FIG. 4, depicting the lower section of the pole and the attachment to the furniture.
Figure 6B:
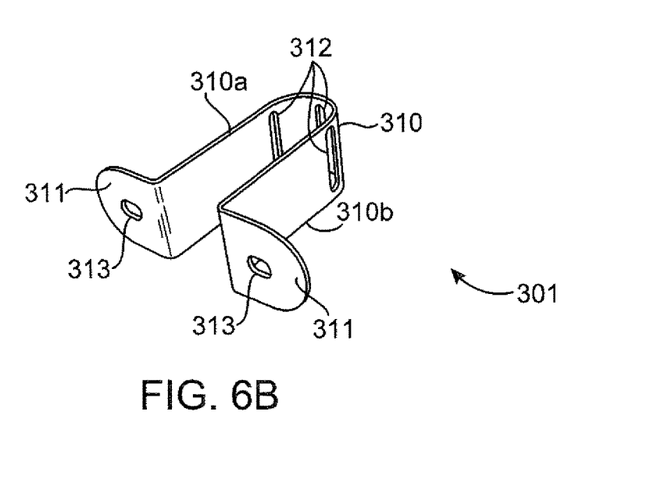
FIG. 6B provides a perspective view of the mounting bracket for attaching the device to the wall or furniture.

In an embodiment, the pole (200) is comprised of an upper section (201) and a lower section (202), as shown in FIG. 5B. A television mount (400) is connected near the top of the upper section (201). The upper section (201) and lower section (202) are connected together by a swivel system (700). The swivel system (700) advantageously allows the television mount (400), and thus the television, to pivot a full 360 degrees, although televisions may only pivot 10 to 15 degrees depending on the size of the television when the device (100) is mounted to a wall (800). Although the upper section (201) and lower section (202) are approximately equal in length in the depicted embodiments, such a configuration is by no means necessary. For example, the lower section (202) may be shorter or longer (or an adjustable length) depending on the height of the associated piece of furniture (900). The differing heights would allow, for example, the lower section (202) of the pole (200) to be hidden by the piece of furniture (900). Similarly, the upper section (201) may be longer or shorter depending on the desired height of the television mount (400).

The lower section (202) of the pole (200) has a series of holes (203), which are used for connecting the mount brackets ((301) and (302)) to the pole (200), as discussed more fully below. In an embodiment, as shown and suggested in FIGS. 5B and 6A for example, there are three lines of equally spaced-apart holes (203), with holes on each of the sides of the pole (200) and on the back (or front) of the pole (200). This series of holes (203) allows the brackets ((301) and (302)) to be connected to the pole (200) with three screws, or the like, which offers the needed strength for mounting the pole (200) to either the wall (800) or a piece of furniture (900). Additionally, the holes (203) in each of the lines are spaced approximately 1 inch apart, which, along with the oblong apertures (312) in the brackets discussed more fully below, allows the brackets ((301) and (302)) to be placed at any position along the pole (200). In other words, this arrangement allows for the one of the brackets (301) to be secured to differing places on the wall (800) or furniture (900) and another of the brackets (302) to be secured to differing heights of the underside of the piece of furniture (900)—all with little to no differentiation in the design of the device (100).

Additionally, the lower section (202) is load-bearing and adds extra stability to the device (100). In other words, the lower section (202) provides sufficient vertical, downward support such that the weight of the television is borne by the pole (200). As a result of this configuration, advantageously, the television does not need to be mounted directly to the wall (800). While the device (100) is mounted to the wall (800) or furniture (900), this connection merely provides lateral support to prevent the device (100) from toppling forward or to the sides and, and as a result, it is not necessary to bolt the device (100) to studs in the wall (800).

As noted above, the lower section (202) of the pole (200) is connected to the upper section (201), preferably by a connection that allows for full rotation of the upper and lower sections ((201) and (202)) (e.g., the swivel system (700)), with the top part of the upper section (201) preferably, but not necessarily, being secured to the wall (800) by a mount bracket (301). However, even when secured to the wall (800) by a mount bracket (301), the upper section (201) should still be able to rotate freely about the lower section (202). Additionally, the upper section (201) may have an additional integrated swivel system (700) near the top where the third, optional mount bracket (301) is secured to the wall (800). Although optional and by no means necessary, this additional swivel system (700) allows the upper section (201) to pivot even when the mount bracket (301) is secured to the wall (800) at the top of the upper section (201), as there are swivel systems (700) both above and below the television mount (400).

The upper section (201) of the pole (200) also has a television mount (400), and optionally a shelf (600), secured thereto. The television can then be connected to the television mount (400), which can then be removably attached to the upper section (201) of the pole (200). The television mount may be sized to accommodate a variety of sizes of televisions, including but not limited to televisions up to a 65 inch flat panel display television, although the size of the mount and television may vary as needed. In an embodiment, the television mount (400) comprises a rectangular frame (401) with two parallel mount brackets (402), with the frame (401) attached to the pole (200). Additionally, the television mount is equipped with a tilt mechanism. The tilt mechanism is comprised of adjustable knobs (403) which enable the parallel mount brackets (402) to be adjusted downward and upward. Combined with the swivel system (700), the tilt mechanism allows for a full range and optimization of viewing angles. Further, the television mount (400) may include a removable or permanent bubble level (404) to ensure proper alignment of the mount (400) upon installation. As one of ordinary skill in the art would readily appreciate, the precise configuration for mounting a television described herein (i.e., the frame (401), mount brackets (402), and tilting mechanism) is by no means the only type of television mount that could be incorporated into the piece of furniture of the present disclosure. Other television mounts, as that term is readily understood, would be appropriate for use in the device of the present disclosure.

As noted, the device may also include a shelf (600). In one embodiment, as shown in FIG. 5B, the bottom part of the upper section (201) of the pole (200) has holes (204) for receiving the shelf (600) which is attached to the pole (200) by a cantilevered bracket (303). Alternatively, the shelf (600) can be mounted directly to the wall (800) and apart from the pole (200) by a wall bracket (304).

As discussed above, there are generally two types of mount brackets used to secure the device to either the wall or the furniture ((301) and (302)). One mount bracket (301), shown in FIGS. 6A & 6B, generally comprises a U-shaped base (310) having two sides ((310a) and (310b)) with two flanges (311) that extend outward and perpendicular to both sides ((310a) and (310b)) of the base (310)—resulting in an almost omega-shaped bracket. At the top of the U-shaped base (310), and between the two sides ((310a) and (310b)), there are three oblong apertures (312) for securing the mount bracket (301) to the pole (200). The three oblong apertures (312) are configured to connect to and align with the series of three holes (203) of the lower section (202) of the pole (200). Screws (350) can then be inserted through the oblong apertures (312) and into the holes (203) to secure the mount bracket (301) to the pole (200). In an embodiment, the oblong apertures (312) are approximately 1.25 inches tall, which, along with the holes (203) in the pole (200) discussed more fully above, allows the mount bracket (301) to be placed at any position along the lower section (202) of pole (200). Additionally, the mount bracket (301) can be secured to the top part of the upper section (201) of the pole (200) in a similar manner. The two flanges (311) of the mount bracket (301) also have holes (313), which are used for securing the device (100) to either the wall (800) or the backside of furniture (900) by screwing screws (350) through the holes (313) and into the wall (800) or furniture (900). Although screws (350) are depicted, one of ordinary skill in the art would readily recognize that a variety of wall anchor hardware could be utilized, including, but not limited to, nails, dry-wall screws, anchor-screw combination, or the like.

Figure 7A:
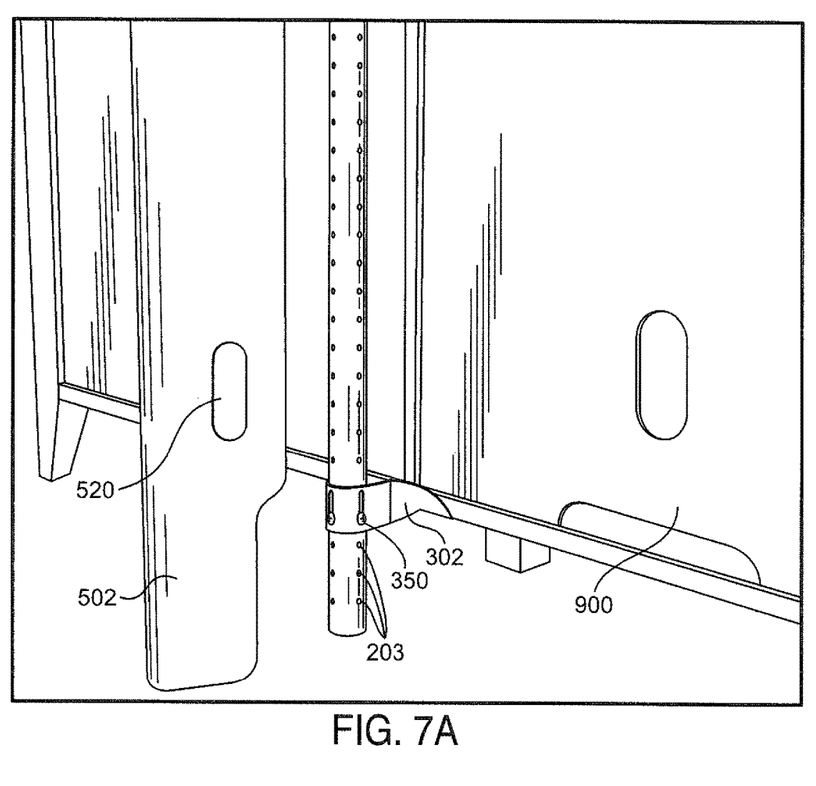
FIG. 7A provides a perspective view of the embodiment in FIG. 4, depicting the lower section of the pole and the attachment to the underside of the furniture.
Figure 7B:
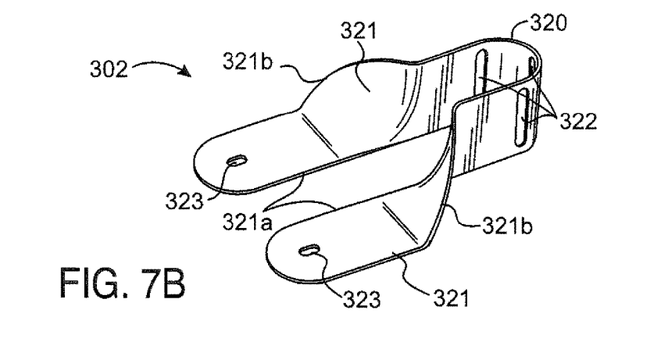
FIG. 7B provides a perspective view of the mounting bracket for attaching the device to the underside of the furniture.

The other mount bracket (302), shown in FIGS. 7A & 7B, comprises a U-shaped base (320) having with two flanges (321) that extend from the base (320), each flange having two sides ((321a) and (321b)), with one side (321b) of each of the flanges (321) extending from the base (320) in a helix-like curve. In other words, the two sides ((321a) and (321b)) of the respective flange (321) are parallel along the first axis (e.g., y-axis) as the sides extend from the base (320), but one side (321a) of the flange (321) continues along the same line as the base (320) and the other side (321b) of the flange (321) makes a helix-like curve as it extends from the base (320) until the two sides ((321a) and (321b)) of the respective flange (321) are parallel along the opposing axis (e.g., the x-axis).

At the top of the U-shaped base (320), there are three oblong apertures (322) for securing the mount bracket (302) to the pole (200). The three oblong apertures (322) are configured to connect to and align with the series of the three holes (203) of the lower section (202) of the pole (200). Screws (350) can then be inserted through the oblong apertures (322) and into the holes (203) to secure the mount bracket (302) to the pole (200). In an embodiment, the oblong apertures (322) are approximately 1.25 inches tall, which, along with the holes (203) in the pole (200) discussed more fully above, allows the mount bracket (302) to be placed at any position along the lower section (202) of pole (200). The two flanges (321) of the mount bracket (302) also have holes (323) on the portion of the flanges (321) where the two sides ((321a) and (321b)) are parallel along the x-axis. These holes (323) are used for securing the pole (200) to the underside of the furniture (900) by screwing screws (350) through the holes (323) and into the underside of the furniture (900), as shown in FIGS. 7A & 7B. Again, although screws (350) are depicted, one of ordinary skill in the art would readily recognize that a variety of wall anchor hardware could be utilized, including, but not limited to, nails, dry-wall screws, anchor-screw combination, or the like.

Figure 8A:
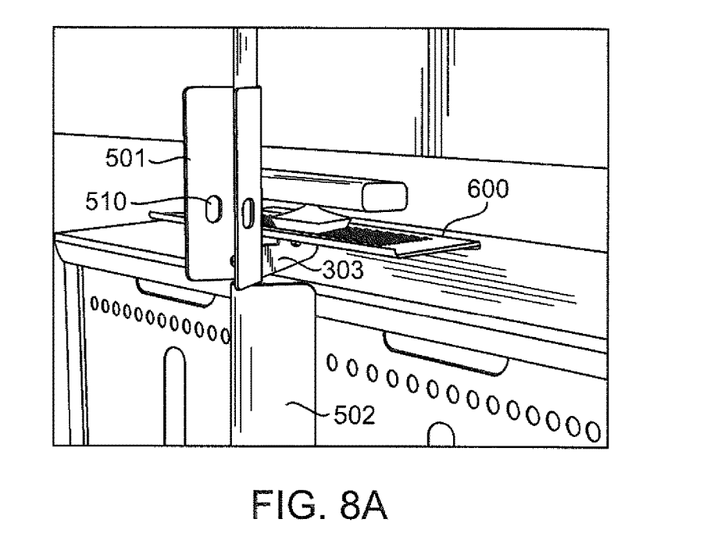
FIG. 8A provides a perspective view of the embodiment in FIG. 4, depicting the attachment of the shelf to the device.
Figure 8B:
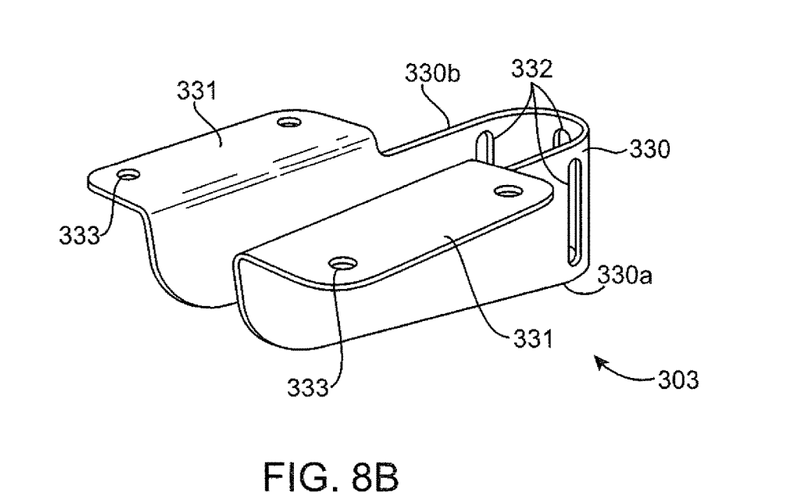
FIG. 8B provides a perspective view of the cantilevered bracket for attaching the shelf to the pole of the device.

In addition to the two mounting brackets ((301) and (302)), there are two other types of brackets used to secure the shelf: the cantilevered bracket (303) for securing the shelf (600) to the pole (200), which can be secured at differing heights on the pole (200); and the wall bracket (304) for securing the shelf (600) directly to the wall (800). The cantilevered bracket (303), as shown in FIGS. 8A & 8B, generally comprises a U-shaped base (330) having two sides ((330a) and (330b)) with two flanges (331) that extend outward and perpendicular to one side (330a) of the base (330). At the top of the U-shaped base (330), and between the two sides ((330b) and (330b)), there are three oblong apertures (332) for securing the cantilevered bracket (303) to the pole (200). The three oblong apertures (332) are configured to connect to and align with the holes (204) on the bottom part of the upper section (201) of the pole (200). Screws (350) can then be inserted through the oblong apertures (332) and into the holes (204) to secure the cantilevered bracket (303) to the pole (200). In an embodiment, the oblong apertures (332) are approximately 1.25 inches tall, which, along with the holes (204) in the pole (200) discussed more fully above, allows the cantilevered bracket (303) to be placed at various heights along the bottom part of the upper section (201) of pole (200). The two flanges (331) of the cantilevered bracket (303) also have holes (333), which are used for securing the shelf (600) to the cantilevered bracket (303) by screwing screws (350) through the holes (333) and into the shelf (600). Although screws (350) are depicted, one of ordinary skill in the art would readily recognize that a variety securing means could be utilized, including, but not limited to, nails, glue, molding, or the like.

Figure 9A:
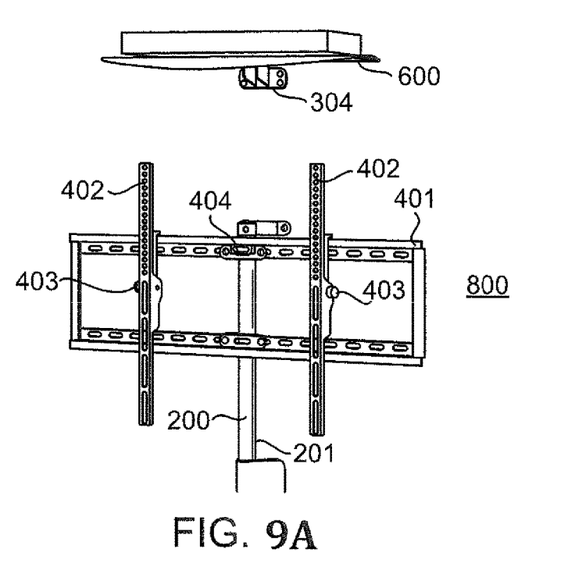
FIG. 9A provides a perspective view of the television mount attached to the upper section of the device with a shelf mounted above the pole of the device.
Figure 9B:
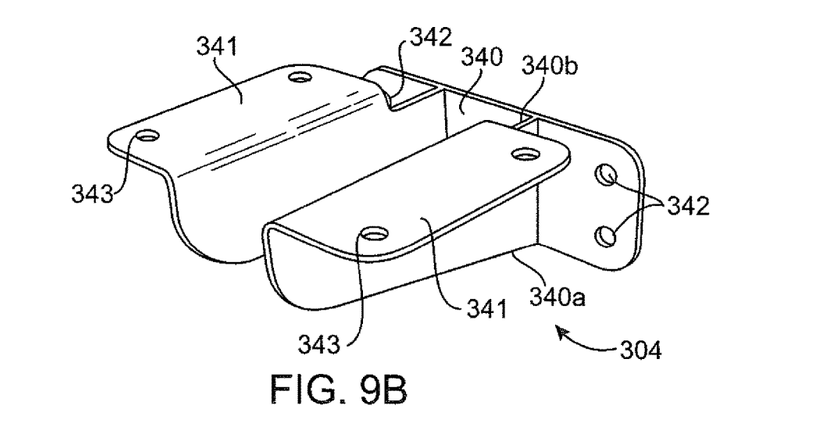
FIG. 9B provides a perspective view of the wall bracket for attaching the shelf directly to the wall.

The wall bracket (304) is similar to the cantilevered bracket (303), except instead of the a U-shaped base, the wall bracket (304) has a pi($\pi$)-shaped base (340), as shown in FIGS. 9A & 9B. Thus, like the cantilevered bracket (303), the wall bracket (304) has two sides ((340a) and (340b)) with two flanges (341) that extend outward and perpendicular to one side (340b) of the base (340). At both sides of the top end of the pi($\pi$)-shaped base (340), there are two apertures (342) for securing the wall bracket (304) to the wall (800) by screwing screws (350) through the apertures (342) and into the wall (800). The two flanges (341) of the wall bracket (304) also have holes (343), which are used for securing the shelf (600) to the wall bracket (304) by screwing screws (350) through the holes (343) and into the shelf (600). Although screws (350) are depicted, one of ordinary skill in the art would readily recognize that a variety securing means could be utilized, including, but not limited to, nails, glue, molding, or the like.

Figure 10A:
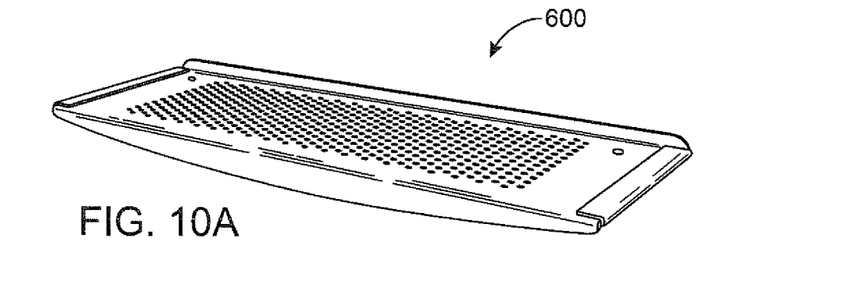
FIG. 10A provides a perspective view of the shelf in the compressed position.
Figure 10B:
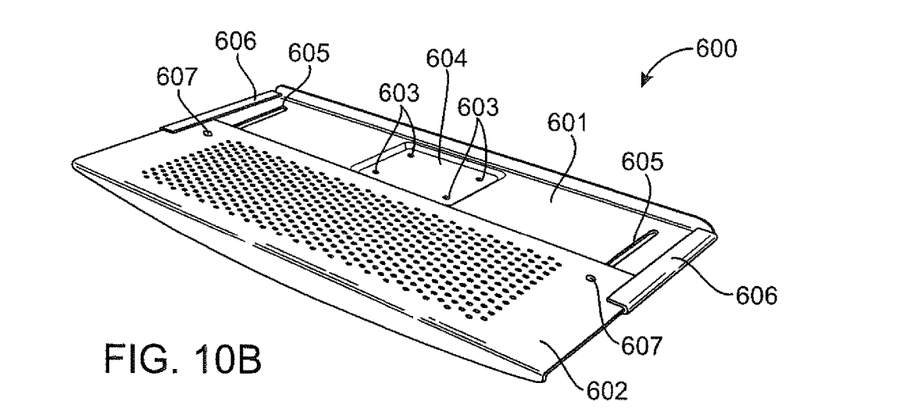
FIG. 10B provides a perspective view of the shelf in the expanded position.
Figure 11:
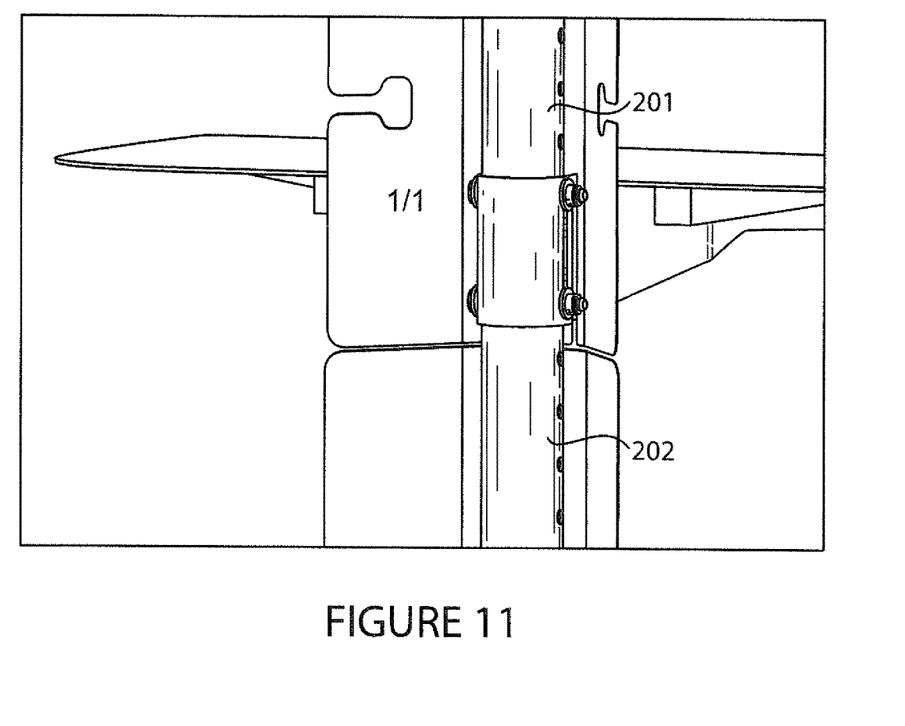
FIG. 11 provides a detail view of an embodiment of a two portion elongated pole.

As noted, the shelf (600) can be attached to either the pole (200) or the wall (800). The shelf (600) is generally depth-adjustable, and thus is comprised of two planar pieces—a mounting portion (601) and an adjustable portion (602), as shown in FIGS. 10A & 10B. To secure the shelf (600) to the pole (200), the mounting portion (601) has holes (603) on a recessed portion (604) to match with the holes ((333) and (343)) on the flanges ((331) and (341)) of the cantilevered bracket (303) and the wall bracket (304), respectively. The mounting portion (601) also has slots (605) and restrictor guards (606) for receiving the adjustable portion (602). Thus, the adjustable portion (602) can slide between the restrictor guards (606) to allow for a depth-adjustable shelf (600). To prevent the adjustable portion (602) from separating with the mount portion (601), the adjustable portion (602) has pegs (607) which fit into the slots (605) of the mount portion (601). As a result, and in an embodiment, the shelf (600) is able to adjust in depth from 6 inches to 10 inches or more, for example.

As noted above, the device (100) also includes covers ((501) and (502)) for the pole (200) that can be easily attached and removed as needed and which serve a dual purpose—they hide the pole (200) and create a channel for managing wires of the television and associated electronic devices. These covers ((501) and (502)) generally comprise an elongated V-shaped member with a rounded apex. Additionally, there are generally two covers—an upper cover (501) which conceals a portion of the length of the upper section (201) of the pole (200) and a lower cover (502) which conceals the majority of the length of the lower section (202) of the pole (200), resulting in an internal space between the covers ((501) and (502)) and the wall (800). This configuration advantageously results in an internal, hollow space between the covers ((501) and (502)) and the wall (800) which can be used to house and hide electronic wires. The covers ((501) and (502)) are preferably removably connected in such a manner that the covers ((501) and (502)) can be connected and removed without the need for tools, for example, by simply snapping the covers ((501) and (502)) over the pole (200), and more preferably over the base (310) of the mount bracket (301) for the lower cover (502). Additionally, these covers ((501) and (502)) preferably have caps ((510) and (520)) which can be easily removed to allow the wire to pass through the hole for further management of the wires and for access to the wires and wire channels created by the covers ((501) and (502)). As a result, when the television is mounted and the electronics placed on the shelf (600), the wires connecting the electronics and plugging into the outlet are advantageously hidden behind the covers ((501) and (502)) and can be accessed through the caps ((510) and (520)).

Additionally, the upper cover (501) is generally attached above the shelf (600), when present, and the lower cover is generally attached below the shelf (600). In this regard, the upper cover (501) may include slits (511). These slits (511) allow the cantilevered bracket (303) to be moved upward or downwards. Thus, the shelf (600) can be positioned at various heights. In other words, the sides ((330a) and (330b)) of the base (330) of the cantilevered bracket (303) slide into the slits (511) to allow a range of shelf (600) heights. Alternatively, the shelf (600) can be positioned at a fixed height and the upper cover (501) adjusted.

The lower cover (502) may also be shaped to accommodate base rails. For example, the lower part of the lower cover (502) may be offset from the wall (800) at a sufficient distance such that the part of the lower cover (502) is substantially flush against the wall (800) while the lower part of the lower cover (502) is either separated from the wall or substantially flush against any molding on the wall (800). Additionally, the lower cover (502) can be attached to either the front side or back side of the pole (200) (i.e., the rounded apex can either face outward or inward towards the wall). For example, when the device (100) is mounted and secured directly to the wall (800), the lower cover (502) generally faces outward to create a wire channel for effective management of the wires, as shown, for example, in FIGS. 1-2; a piece of furniture (900) can then also be placed in front of the device (100) when in this configuration, as shown, for example, in FIG. 3. Alternatively, when the device (100) is mounted to the backside of the furniture (900), the lower cover (502) may be reversed, with the rounded apex facing the wall (900), to create a wire channel behind the furniture (900), as shown, for example, in FIGS. 4, 7A & 7B.

Although not described in detail, numerous other embodiments are possible in accordance with the present invention. Several of these embodiments are shown and depicted herein.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A television mounting system comprising:
   an elongated pole, said pole including a bottom weight-bearing end placed on the floor of a structure and a television mount attached toward the top end thereof;
   a mounting bracket, said mounting bracket sized and shaped to mount said elongated pole to a wail at a distance from said wall;
   wherein, said wall is a permanent wall of a structure; and
   a cover, the cover attaching to the pole in such a manner so as to create an enclosed space;
   wherein, said enclosed space is defined by said cover forming at least one side and said wall forming at least one side;
   wherein said enclosed space is configured to accept a plurality of cables from a television mounted on said television mount; and
   wherein said enclosed space includes said pole.

2. The system of claim 1, wherein said mounting bracket is one of a plurality of mounting brackets used to secure said pole to said wall.

3. The system of claim 1, further comprising a shelf attached to said elongated pole.

4. The system of claim 3, wherein said shelf is attached to said elongated pole by a second mounting bracket.

5. The system of claim 3, wherein said shelf can be mounted at a plurality of locations along said pole.

6. The system of claim 3, further comprising an upper cover, said upper cover being positioned between said shelf and said television mount and creating an additional enclosed space;
   wherein, said additional enclosed space is defined by said, upper cover on at least one side and said wall on at least one side;
   wherein said additional enclosed space includes said pole; and
   wherein said additional enclosed space is configured to accept a plurality of cables from a television mounted on said television mount.

7. The system of claim 1, wherein said rover attaches to said elongated pole without the need for tools.

8. The system, of claim 7, wherein said cover snaps into place on said elongated pole.

9. The system of claim 1, wherein said elongated pole comprises at least two sections.

10. The system of claim 9, wherein at least one of said at least two sections rotates about an axis parallel to said elongated pole relative to a second of said at least two sections.

11. A television mounting system comprising:
- an elongated pole, said pole including a bottom weight-bearing end placed on the floor of a structure and a television mount attached toward the top end thereof;
- a mounting bracket, said mounting bracket sized and shaped to mount said elongated pole to a backside of a piece of furniture at a distance from said piece of furniture; and
- a cover, the cover attaching to the pole so as to create an enclosed space;
- wherein, said enclosed space is defined by said cover forming at least one side and said backside of said piece of furniture forming at least one side;
- wherein said enclosed space is configured to accept a plurality of cables from a television mounted on said television mount; and
- wherein said enclosed space includes said pole.

12. The system of claim 11, wherein said mounting bracket is one of a plurality of mounting brackets.

13. The system of claim 12, wherein said plurality of mounting brackets includes at least one bracket for securing said pole to an underside of said piece of furniture.

14. The system of claim 11, further comprising a shelf attached to said elongated pole.

15. The system of claim 14, wherein said shelf is attached to said elongated pole by a second mounting bracket.

16. The system of claim 14, wherein said shelf can be mounted at a plurality of locations along said pole.

17. The system of claim 14, further comprising an upper cover, said upper cover being positioned between said shelf and said television mount and creating an additional enclosed space;
- wherein, said additional enclosed space is defined by said upper cover on at least one side and a wall positioned adjacent said backside of said piece of furniture on at least one side;
- wherein said additional enclosed space includes said pole; and
- wherein said additional enclosed space is configured to accept a plurality of cables from a television mounted on said television mount.

18. The system of claim 11, wherein said cover attaches to said elongated pole without the need for tools.

19. The system of claim 18, wherein said cover snaps into place on said elongated pole.

20. The system of claim 11, wherein said elongated pole comprises at least two sections, at least one of said at least two sections rotating about an axis parallel to said elongated pole relative to a second of said at least two sections.

* * * * *

UNITED STATES PATENT AND TRADEMARK OFFICE
CERTIFICATE OF CORRECTION

PATENT NO. : 9,631,769 B2
APPLICATION NO. : 13/893119
DATED : April 25, 2017
INVENTOR(S) : Kevin McGowan, Steve Wahrhaftig and Cory Neudeck It is certified that error appears in the above-identified patent and that said Letters Patent is hereby corrected as shown below:

In the Claims

Column 10, Line 31 of Claim No. 1, "wail" should be changed to "wall"

Signed and Sealed this
Seventh Day of November, 2017

Joseph Matal
*Performing the Functions and Duties of the
Under Secretary of Commerce for Intellectual Property and
Director of the United States Patent and Trademark Office*